DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 14, 1971

983 O.G. 401

T893,002

METHOD FOR THE SELECTIVE CONTROL OF ANNUAL GRASS

Harvey D. Bidlack, 4272 E. Isabella County Line Road, Shepherd, Mich. 48883, and William T. Irvine, 842 Scheurmann Road, Bay City, Mich. 48706

Filed May 7, 1970, Ser. No. 35,557

Int. Cl. A01n *9/22*

U.S. Cl. 71—92

No Drawing. 10 Pages Specification

A new composition and method for the suppression of the growth of annual grass of the genus Digiteria, and particularly for the preemergent control of crabgrass by exposing crabgrass seeds to a composition comprising a growth suppressing amount of a 4-substituted cinnoline, in particular, 4-cinnolinecarbonitrile.